US009056950B2

(12) United States Patent
Hofmann et al.

(10) Patent No.: US 9,056,950 B2
(45) Date of Patent: Jun. 16, 2015

(54) COMPOSITE POLYMERIC ARTICLES FORMED FROM EXTRUDED SHEETS CONTAINING A LIQUID CRYSTAL POLYMER

(75) Inventors: Achim Hofmann, Rimbach (DE); Paul C. Yung, Cincinnati, OH (US)

(73) Assignee: Ticona GmbH, Sulzbach (DE)

( * ) Notice: Subject to any disclaimer, the term of this patent is extended or adjusted under 35 U.S.C. 154(b) by 900 days.

(21) Appl. No.: 13/183,874

(22) Filed: Jul. 15, 2011

(65) Prior Publication Data

US 2012/0021212 A1    Jan. 26, 2012

Related U.S. Application Data

(60) Provisional application No. 61/367,175, filed on Jul. 23, 2010.

(51) Int. Cl.
| | |
|---|---|
| *B32B 27/32* | (2006.01) |
| *B32B 5/16* | (2006.01) |
| *C09K 19/00* | (2006.01) |
| *C08J 5/00* | (2006.01) |
| *B29C 43/00* | (2006.01) |
| *B29C 47/00* | (2006.01) |
| *B29C 51/00* | (2006.01) |
| *B29C 51/02* | (2006.01) |
| *B29C 43/24* | (2006.01) |
| *B29C 47/34* | (2006.01) |
| *B29C 51/10* | (2006.01) |
| *B29K 105/00* | (2006.01) |
| *B29K 105/16* | (2006.01) |
| *B29L 7/00* | (2006.01) |
| *B29L 23/00* | (2006.01) |
| *B29L 31/00* | (2006.01) |

(52) U.S. Cl.
CPC ............... *C08J 5/00* (2013.01); *Y10T 428/266* (2015.01); *B29C 43/003* (2013.01); *B29C 43/24* (2013.01); *B29C 47/0019* (2013.01); *B29C 47/0021* (2013.01); *B29C 47/003* (2013.01); *B29C 47/0033* (2013.01); *B29C 47/34* (2013.01); *B29C 51/002* (2013.01); *B29C 51/02* (2013.01); *B29C 51/10* (2013.01); *B29C 2791/001* (2013.01); *B29C 2791/006* (2013.01); *B29C 2791/007* (2013.01); *B29C 2793/0081* (2013.01); *B29K 2105/0079* (2013.01); *B29K 2105/16* (2013.01); *B29K 2995/0016* (2013.01); *B29L 2007/008* (2013.01); *B29L 2023/001* (2013.01); *B29L 2031/712* (2013.01); *B29L 2031/7134* (2013.01); *C08J 2300/12* (2013.01); *C08J 2300/14* (2013.01)

(58) Field of Classification Search
None
See application file for complete search history.

(56) References Cited

U.S. PATENT DOCUMENTS

| 4,161,470 | A |  | 7/1979 | Calundann |
| 4,414,365 | A |  | 11/1983 | Sugimoto et al. |
| 4,563,508 | A | * | 1/1986 | Cottis et al. ................... 525/444 |
| 4,569,786 | A |  | 2/1986 | Deguchi |
| 4,626,557 | A |  | 12/1986 | Duska et al. |
| 4,741,955 | A |  | 5/1988 | Saito et al. |
| 4,772,422 | A |  | 9/1988 | Hijikata et al. |
| 4,833,007 | A |  | 5/1989 | Huang |
| 4,851,467 | A |  | 7/1989 | Frayer |
| 4,874,800 | A |  | 10/1989 | Minamisawa et al. |
| 4,891,261 | A |  | 1/1990 | Zaidi et al. |
| 4,922,811 | A |  | 5/1990 | Stumpf |
| 5,015,723 | A |  | 5/1991 | Sugimoto et al. |
| 5,017,304 | A |  | 5/1991 | Hijikata |
| 5,079,289 | A |  | 1/1992 | Layton et al. |
| 5,096,957 | A |  | 3/1992 | Duska |
| 5,110,896 | A |  | 5/1992 | Waggoner et al. |
| 5,132,336 | A |  | 7/1992 | Layton et al. |
| 5,141,985 | A |  | 8/1992 | Asai et al. |
| 5,204,443 | A |  | 4/1993 | Lee et al. |
| 5,216,092 | A |  | 6/1993 | Huspeni et al. |
| 5,300,747 | A |  | 4/1994 | Simon |
| 5,326,848 | A |  | 7/1994 | Kashimura et al. |
| 5,331,135 | A |  | 7/1994 | Ovadia |
| 5,399,656 | A |  | 3/1995 | Nitta et al. |
| 5,428,100 | A |  | 6/1995 | Asai et al. |
| 5,492,946 | A |  | 2/1996 | Huspeni et al. |
| 5,508,374 | A |  | 4/1996 | Lee et al. |
| 5,529,716 | A |  | 6/1996 | Nomura et al. |
| 5,601,679 | A |  | 2/1997 | Mulcahy et al. |

(Continued)

FOREIGN PATENT DOCUMENTS

| EP | 0095865 A2 | 12/1983 |
| EP | 0095865 A3 | 12/1983 |

(Continued)

OTHER PUBLICATIONS

Abstract of Chinese Patent—CN101429342, May 13, 2009, 1 page.
Abstract of French Patent—FR2732577, Oct. 11, 1996, 1 page.
Abstract of Japanese Patent—JPH04166320, Jun. 12, 1992, 1 page.
Abstract of Japanese Patent—JPH05177796, Jul. 20, 1993, 2 pages.
Abstract of Japanese Patent—JPH05177797, Jul. 20, 1993, 2 pages.
Abstract of Japanese Patent—JPH05200904, Aug. 10, 1993, 2 pages.
Abstract of Japanese Patent—JP2004091724, Mar. 25, 2004, 1 page.
Abstract of Spanish Patent—ES2278518, Aug. 1, 2007, 2 pages.
Abstract of Spanish Patent—ES2336742, Apr. 15, 2010, 2 pages.
Abstract of WO Patent—WO2009152764, Dec. 23, 2009, 1 page.

(Continued)

*Primary Examiner* — Sheeba Ahmed
(74) *Attorney, Agent, or Firm* — Dority & Manning, P.A.

(57) ABSTRACT

A process for forming shaped three-dimensional products is described made from a composition containing at least one filler and an aromatic liquid crystal polymer. In one embodiment, the process includes forming a substrate such as a film, a sheet or a tube, through an extrusion process. Once the substrate is formed, the substrate is then heated and fed to a shaping process. The shaping process may comprise a thermal forming process or a blow molding process. In order to form the three-dimensional products, the aromatic liquid crystal polymer has a high heat of crystallization, a high melt temperature and/or a high melt viscosity.

13 Claims, 2 Drawing Sheets

(56) References Cited

U.S. PATENT DOCUMENTS

| | | |
|---|---|---|
| 5,616,680 A | 4/1997 | Linstid, III |
| 5,624,984 A | 4/1997 | Furuta et al. |
| 5,626,703 A | 5/1997 | Tomita et al. |
| 5,643,988 A | 7/1997 | Nakamura et al. |
| 5,663,276 A | 9/1997 | Yoneta et al. |
| 5,762,718 A | 6/1998 | Linstid, III et al. |
| 5,767,195 A | 6/1998 | Furuta et al. |
| 5,798,432 A | 8/1998 | Lee et al. |
| 5,804,634 A | 9/1998 | Umetsu et al. |
| 5,820,780 A | 10/1998 | Furuta et al. |
| 5,830,940 A | 11/1998 | Nakamura et al. |
| 5,845,805 A | 12/1998 | Ragland |
| 5,847,039 A | 12/1998 | Nagashima et al. |
| 5,921,173 A | 7/1999 | Grycan et al. |
| 5,976,406 A | 11/1999 | Nagano et al. |
| 5,981,007 A | 11/1999 | Rubin et al. |
| 5,981,411 A | 11/1999 | Brown |
| 5,997,765 A | 12/1999 | Furuta et al. |
| 5,998,005 A | 12/1999 | Kanno |
| 6,051,664 A | 4/2000 | Nagashima et al. |
| 6,093,765 A | 7/2000 | Cottis |
| 6,117,932 A | 9/2000 | Hasegawa et al. |
| 6,121,369 A | 9/2000 | Stack et al. |
| 6,124,004 A | 9/2000 | Furuta et al. |
| 6,140,455 A | 10/2000 | Nagashima et al. |
| 6,177,500 B1 | 1/2001 | Okamoto et al. |
| 6,194,524 B1 | 2/2001 | Nagashima et al. |
| 6,242,077 B1 | 6/2001 | Tojo et al. |
| 6,268,026 B1 | 7/2001 | Jester et al. |
| 6,279,469 B1 | 8/2001 | Bailey |
| 6,294,643 B1 | 9/2001 | Harada et al. |
| 6,296,930 B1 | 10/2001 | Ohbe et al. |
| 6,331,343 B1 | 12/2001 | Perez et al. |
| 6,333,393 B1 | 12/2001 | Harada |
| 6,376,076 B1 | 4/2002 | Ohbe et al. |
| 6,468,665 B1 | 10/2002 | Nagashima et al. |
| 6,495,616 B2 | 12/2002 | Maeda |
| 6,524,694 B1 | 2/2003 | Phillips |
| 6,528,164 B1 | 3/2003 | Ohbe et al. |
| 6,582,625 B2 | 6/2003 | Nagashima et al. |
| 6,586,073 B2 | 7/2003 | Perez et al. |
| 6,627,239 B1 | 9/2003 | Gavie et al. |
| 6,649,730 B2 | 11/2003 | Okamoto et al. |
| 6,656,386 B2 | 12/2003 | Suenaga et al. |
| 6,656,578 B2 | 12/2003 | Ohbe et al. |
| 6,733,691 B2 | 5/2004 | Nagano et al. |
| 6,753,080 B1 | 6/2004 | Sebastian et al. |
| 6,758,989 B2 | 7/2004 | Miyashita et al. |
| 6,774,203 B1 | 8/2004 | Fukute |
| 6,793,847 B2 | 9/2004 | Maeda et al. |
| 6,814,905 B1 | 11/2004 | Dalgewicz et al. |
| 6,833,405 B1 | 12/2004 | Cottis |
| 6,881,937 B2 | 4/2005 | Swiontek |
| 6,884,450 B2 | 4/2005 | Wu et al. |
| 6,890,988 B2 | 5/2005 | Hosoda |
| 6,894,141 B2 | 5/2005 | Satoh et al. |
| 6,942,120 B2 | 9/2005 | Trent et al. |
| 6,986,864 B2 | 1/2006 | Porter |
| 7,014,921 B2 | 3/2006 | Okamoto et al. |
| 7,022,413 B2 | 4/2006 | Katagiri et al. |
| 7,063,892 B2 | 6/2006 | Okamoto et al. |
| 7,094,359 B2 | 8/2006 | Okamoto et al. |
| 7,144,181 B2 | 12/2006 | Areh et al. |
| 7,179,401 B2 | 2/2007 | Ueno et al. |
| 7,244,807 B2 | 7/2007 | Ohtomo et al. |
| 7,258,246 B2 | 8/2007 | Tingley |
| 7,261,937 B2 | 8/2007 | Lee et al. |
| 7,304,121 B2 | 12/2007 | Kato et al. |
| 7,335,318 B2 | 2/2008 | Asahara et al. |
| 7,375,166 B2 | 5/2008 | Tadros et al. |
| 7,393,467 B2 | 7/2008 | Asahara et al. |
| 7,465,420 B2 | 12/2008 | Yoshikawa et al. |
| 7,470,453 B1 | 12/2008 | Lewis et al. |
| 7,479,327 B2 | 1/2009 | Domine |
| 7,482,053 B2 | 1/2009 | Swiontek |
| 7,531,222 B2 | 5/2009 | Terada et al. |
| 7,540,394 B2 | 6/2009 | Brasset |
| 7,544,420 B2 | 6/2009 | Domine et al. |
| 7,550,093 B2 | 6/2009 | Seo et al. |
| 7,560,005 B2 | 7/2009 | Lee et al. |
| 7,578,950 B2 | 8/2009 | Kirchner et al. |
| 7,618,552 B2 | 11/2009 | Hosoda et al. |
| 7,744,993 B2 | 6/2010 | Wu et al. |
| 7,775,392 B2 | 8/2010 | Millsap et al. |
| 7,816,014 B2 | 10/2010 | Ito et al. |
| 7,820,304 B2 | 10/2010 | Groll |
| 7,842,760 B2 | 11/2010 | Yonezawa et al. |
| 7,850,035 B2 | 12/2010 | Lion et al. |
| 7,861,886 B2 | 1/2011 | Lion et al. |
| 8,026,309 B2 | 9/2011 | Halahmi et al. |
| 8,044,151 B2 | 10/2011 | Asahara et al. |
| 8,076,000 B2 | 12/2011 | Domine |
| 8,178,646 B2 | 5/2012 | Kohinata et al. |
| 8,202,448 B2 | 6/2012 | Fukuhara et al. |
| 8,231,805 B2 | 7/2012 | Fukuhara et al. |
| 8,231,807 B2 | 7/2012 | Yonezawa et al. |
| 8,337,719 B2 | 12/2012 | Hosoda et al. |
| 8,470,962 B2 | 6/2013 | Nelson |
| 8,541,078 B2 | 9/2013 | Adams et al. |
| 2003/0118836 A1 | 6/2003 | Lee et al. |
| 2003/0148010 A1 | 8/2003 | Keese et al. |
| 2003/0175499 A1 | 9/2003 | Phillips |
| 2004/0213928 A1 | 10/2004 | Sebastian et al. |
| 2005/0143508 A1 | 6/2005 | Tyagi et al. |
| 2005/0145623 A1 | 7/2005 | Pool, III et al. |
| 2005/0199133 A1 | 9/2005 | Narula et al. |
| 2005/0260372 A1 | 11/2005 | Matsuoka et al. |
| 2006/0014876 A1 | 1/2006 | Bushelman et al. |
| 2006/0159718 A1 | 7/2006 | Rathenow et al. |
| 2006/0230947 A1 | 10/2006 | Poppe |
| 2007/0054139 A1 | 3/2007 | Domine |
| 2007/0196644 A1 | 8/2007 | Wu et al. |
| 2007/0197710 A1 | 8/2007 | Wu et al. |
| 2008/0223860 A1 | 9/2008 | Rutherford et al. |
| 2009/0286023 A1 | 11/2009 | Dobreski et al. |
| 2009/0311544 A1 | 12/2009 | Lee et al. |
| 2010/0227963 A1 | 9/2010 | Hironaka et al. |
| 2011/0189355 A1 | 8/2011 | Field et al. |
| 2013/0231435 A1 | 9/2013 | Hironaka et al. |

FOREIGN PATENT DOCUMENTS

| | | |
|---|---|---|
| EP | 0 398 624 A2 | 11/1990 |
| EP | 0846419 A1 | 6/1998 |
| EP | 1526039 A2 | 4/2005 |
| EP | 1526039 A3 | 4/2005 |
| EP | 1527687 A1 | 5/2005 |
| GB | 2315698 A | 2/1998 |
| GB | 2406259 A | 3/2005 |
| GB | 2406489 A | 3/2005 |
| GB | 2407153 A | 4/2005 |
| GB | 2423693 A | 9/2006 |
| WO | WO 9517446 A1 | 6/1995 |
| WO | WO 0104190 A1 | 1/2001 |
| WO | WO 0104196 A1 | 1/2001 |
| WO | WO 0153159 A1 | 7/2001 |
| WO | WO 2005003221 A1 | 1/2005 |
| WO | WO 2006010061 A1 | 1/2006 |
| WO | WO 2006063225 A1 | 6/2006 |
| WO | WO 2006124146 A2 | 11/2006 |
| WO | WO 2006124146 A3 | 11/2006 |
| WO | WO 2014074228 A1 | 5/2014 |

OTHER PUBLICATIONS

Press Release—Ticona Launches Vectra® T. rex Liquid Crystal Polymer—First LCP Designed for Extrusion and Thermoforming, Sep. 21, 2010, 2 pages.

Product Information—Vectra® LCP T.rex—the first LCP grades for extrusion from Ticona, 2010, 2 pages.

Newsletter—Sep. 2010/Ticona Offers First LCP for Extrusion, 1 page.

Preliminary Data Sheet on Vectra® Liquid Crystal Polymer, Apr. 16, 2010, 1 page.

(56) References Cited

OTHER PUBLICATIONS

Press Release—New High Performance Polymers from Ticona, Jun. 2010, 2 pages.
Product Information—VECTRA® T-rex541/LCP/Specialty from Ticona, Mar. 13, 2012, 2 pages.
News Release—Ticona to Present 5 Technical Papers on Polymer Innovations at SPE ANTEC 2012, 2012, 2 pages.
Release—K Trade Fair, International Trade Fair, No. 1 for Plastics and Rubber Worldwide, Jun. 16, 2010, 1 page.
Abstract of Japanese Patent—JPH05212818, Aug. 24, 1993, 2 pages.
Search Report for Chinese Application No. 201110305882.9, Aug. 7, 2014, 2 pages.
Abstract of Japanese Patent—JP2005007871, Jan. 13, 2005, 1 page.
Partial European Search Report and the European Opinion dated Dec. 19, 2014, 11 pages.
Abstract of Japanese Patent—2010059399, Mar. 18, 2010, 1 page.

* cited by examiner

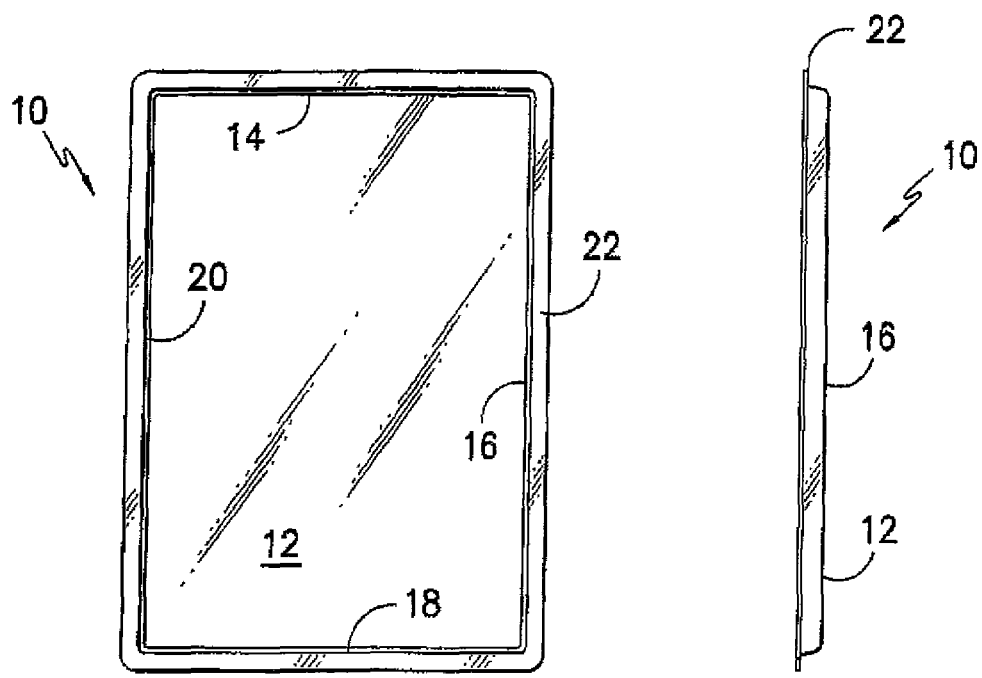
FIG. -1-   FIG. -2-
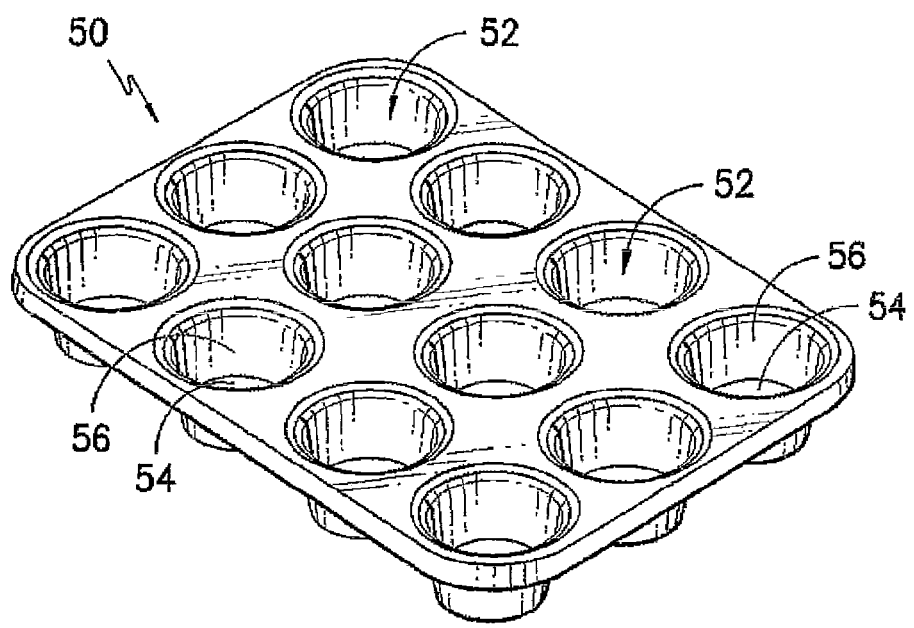
FIG. -3-

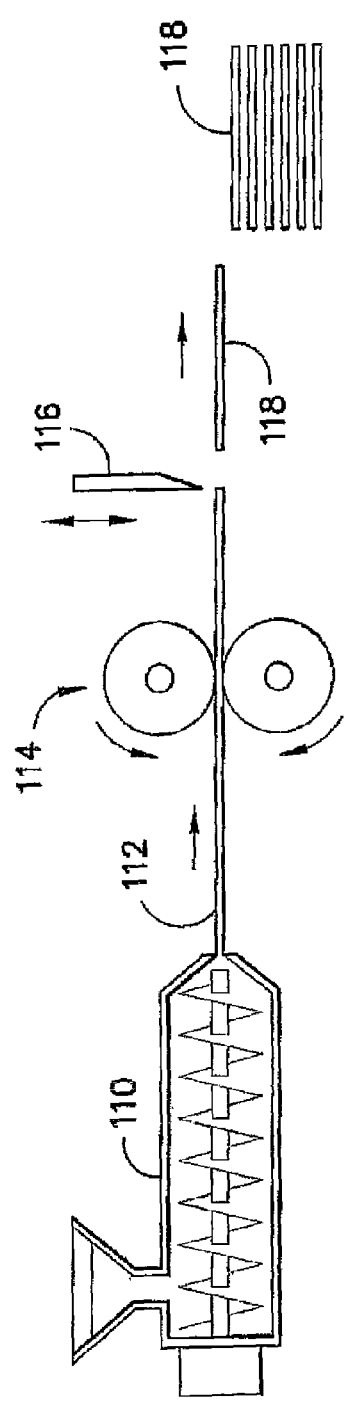
FIG. -4-
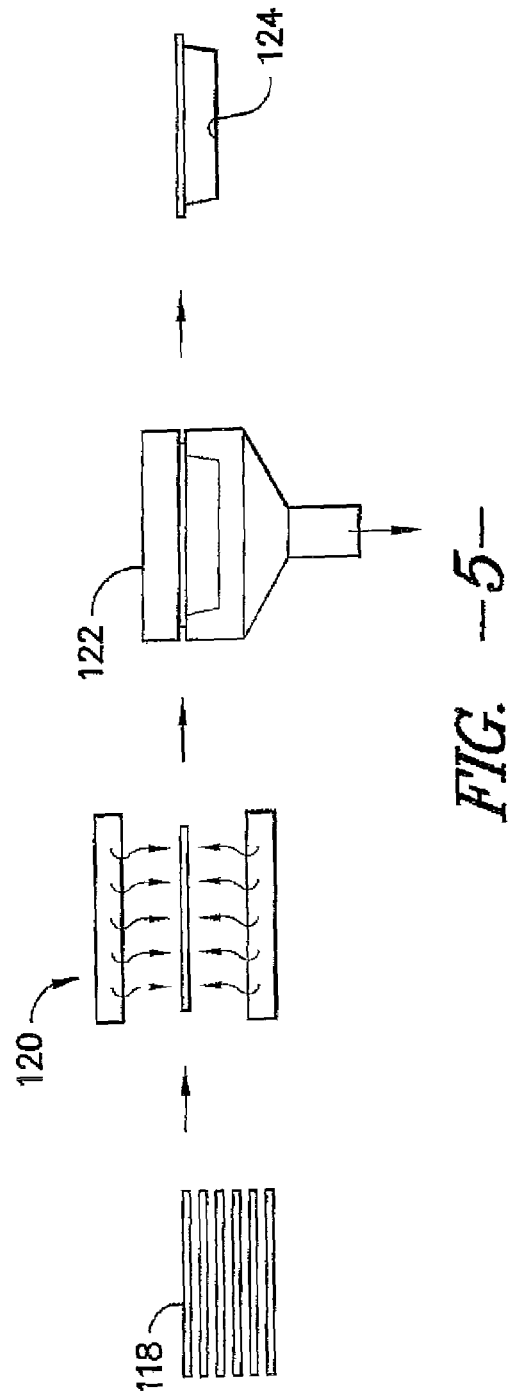
FIG. -5-

COMPOSITE POLYMERIC ARTICLES FORMED FROM EXTRUDED SHEETS CONTAINING A LIQUID CRYSTAL POLYMER

CROSS REFERENCE TO RELATED APPLICATION

This application claims filing benefit of U.S. Provisional Patent Application Ser. No. 61/367,175 having a filing date of Jul. 23, 2010, which is incorporated herein by reference in its entirety.

BACKGROUND

Many baked goods, such as rolls, cookies, pizzas, etc., are baked on cookware or bakeware, such as baking sheets. The bakeware can be flat, such as a baking sheet, or can be shaped, such as bakeware containing domed portions or cavities. Typically, the bakeware as described above have a relatively small thickness in relation to surface area. Many of the above bakeware products, for instance, can have a size of 600 mm×400 mm, 600 mm×800 mm, or, for instance, 800 mm×1000 mm.

Conventional cookware and bakeware products have been made from metals. For example, aluminum, copper, cast iron and stainless steel have all been used to produce the above described products. Metal cookware, for instance, is strong and resistant to breaking and conducts heat very well.

Food stuffs, however, have a tendency to stick to metal surfaces. In order to remedy this problem, modern metal cooking pans and baking pans are frequently coated with a substance in order to minimize the possibility of food sticking to the surface of the utensil. Coatings that have been used in the past include polytetrafluoroethylene (PTFE) or silicone. Such materials, for instance, have been used to coat not only commercial and consumer products, but are also used in many industrial settings, such as industrial bakeries and other food processing plants. Although these coatings can deliver non-stick properties, unfortunately the coatings have a tendency to break down, peel off and degrade over time requiring either replacement or periodic recoating of the metal cookware and bakeware. In addition, the process for producing polytetrafluoroethylene has recently come under scrutiny due to possible health hazards related to various components used to produce the product.

In addition to the above, metal bakeware tends to be relatively heavy and can corrode. In addition, metal bakeware produces loud and noisy sounds when handled. Further, metal sheets can also bend when handled improperly or when dropped.

in the past, those skilled in the art have investigated the use of non-metallic materials to manufacture cookware and bakeware products. For example, U.S. Pat. No. 4,626,557 and U.S. Pat. No. 5,132,336, which are incorporated herein by reference, describe various plastic compositions which can be fabricated into permanent ovenware capable of repeated use in both conventional thermal and microwave ovens. The plastic material is comprised of a wholly aromatic polyester resin that inherently possesses good anti-stick properties that is readily releasable from the food which it contacts. Other patent applications and patents that describe the use of liquid crystal polymers for producing bakeware and cookware are described in U.S. Patent Application Publication No. 2006/0014876, U.S. Patent Application Publication No. 2005/0199133, U.S. Pat. No. 7,540,394, U.S. Pat. No. 6,942,120, U.S. Pat. No. 5,141,985, U.S. Pat. No. 4,922,811, and U.S. Pat. No. 4,741,955, which are also all incorporated herein by reference.

Although various advantages and benefits can be obtained by constructing cookware and bakeware from aromatic liquid crystal polymers, various drawbacks still remain. For instance, in the past, the cookware that contained aromatic liquid crystal polymers was formed through an injection molding process. Although injection molding is an effective way for producing some cookware products, injection molding is generally not satisfactory for producing cookware products that have a large surface area in relation to thickness. Injection molding large-area, planar structures, for instance, can lead to tensions in the molded part, due to the processing speed. For example, when filling large and relatively thin-walled molds using injection molding, high injection pressures are required that unavoidably create high residual stress which can cause warpage of the part or the formation of blisters. In the past, attempts have been made to reduce stress by using multiple injection points on the mold. Using multiple injection points, however, creates seams which form weak points in the resulting product.

In this regard, the present disclosure is directed to an improved process for producing three-dimensional products. As will be described in greater detail below, the process of the present disclosure is particularly well suited for producing three-dimensional products that have large planar surfaces at relatively low thicknesses.

SUMMARY

The present disclosure is generally directed to a process for producing three-dimensional products from a composite material containing an aromatic liquid crystal polymer. As opposed to using injection molding to form an article in one step, the three-dimensional products of the present disclosure are formed in stages, the first stage being extrusion of an aromatic liquid crystal polymer to form a substrate. The substrate may comprise, for instance, a sheet, a film, or a tube. Once formed, the substrates are then shaped into a three-dimensional product using a thermoforming technique or a blow molding technique.

For instance, in one embodiment, a shaped polymeric article can be produced by thermoforming or blow molding an extruded thin substrate into a three-dimensional product having at least one contour. The thin substrate comprises an aromatic liquid crystal polymer combined with filler particles. The filler particles can be present in the thin substrate in an amount from about 20% to about 60% by weight.

In one embodiment, the thin substrate can be formed by heating and extruding the aromatic liquid crystal polymer and filler particle compound mixture into a continuous sheet or film. As used herein, a sheet refers to a planar substrate having a thickness of greater than 500 microns, while a film has a thickness of 500 microns or less. Shortly after the continuous sheet or film is formed, the sheet or film is then calendered in order to improve thickness uniformity. In one embodiment, the calendered sheet or film can have a thickness of less than about 5 mm, such as less than about 2 mm. The sheet can be calendered under conditions such that the thickness of the sheet does not vary by more than one or two microns.

Many aromatic liquid crystal polymers are not capable of being used in the process as described above. For example, liquid crystal polymers typically solidify and/or crystallize at relatively fast rates. Thus, the materials are typically not conducive to being extruded into films or sheets and then calendered without the materials forming blisters, tearing or rupturing. Similar problems are also encountered when attempting to thermoform or blow mold extruded sheets or films made from liquid crystal polymers.

In this regard, the present inventors discovered that the aromatic liquid crystal polymer used in the process of the present disclosure should have various characteristics and properties. For instance, the aromatic liquid crystal polymer, in one embodiment, has a relatively high molecular weight. For instance, the aromatic liquid crystal polymer in one embodiment has a melt viscosity of greater than 50 Pa·s, such as greater than about 80 Pa·s, such as greater than about 100 Pa·s, such as greater than about 150 Pa·s. The aromatic liquid crystal polymer can also have a melt viscosity of less than about 300 Pa·s, such as less than about 275 Pa·s, such as less than about 250 Pa·s. More particularly, the melt viscosity of the aromatic liquid crystal polymer can be from about 80 Pa·s to about 300 Pa·s, such as from about 100 Pa·s to about 275 Pa·s, such as from about 150 Pa·s to about 250 Pa·s. As used herein, the melt viscosity of the aromatic liquid crystal polymer is determined in accordance with ASTM Test No. 1238-70 at 20° C. higher than the melt point as determined by DSC and at a shear rate of $1000 \text{ s}^{-1}$.

In addition to having a relatively high molecular weight, the aromatic liquid crystal polymer also can have a relatively high heat of crystallization. For instance, the aromatic liquid crystal polymer can have a heat of crystallization of greater than about 3.3 J/g, such as greater than about 3.5 J/g, such as greater than about 3.7 J/g. The aromatic liquid crystal polymer can have a heat of crystallization of generally less than about 5.0, such as less than about 4.5, such as less than about 4.2. In certain embodiments, the liquid crystal polymer can have a heat of crystallization of from about 3.3 J/g to about 4.5 J/g, such as from about 3.5 J/g to about 4.2 J/g. As used herein, the heat of crystallization is determined according to ISO Test No. 11357. In addition, the aromatic liquid crystal polymer can also have a heat of fusion of greater than about 3.5 J/g, such as greater than about 4.0 J/g. The aromatic liquid crystal polymer can have a heat of fusion of generally less than about 7.0 J/g, such as less than about 6.5 J/g, such as less than about 5.0 J/g. In certain embodiments, the heat of fusion can be from about 3.5 J/g to about 6.5 J/g. In one embodiment, for instance, the polymer can have a heat of fusion of from about 4.0 J/g to about 5.0 J/g.

The melt viscosity of the aromatic liquid crystal polymer and filler particle mixture should also be relatively high. For instance, the melt viscosity of the mixture can, in one embodiment, be greater than about 80 Pa·s, such as greater than about 100 Pa·s, such as greater than about 130 Pa·s. The melt viscosity, in one embodiment, can generally be less than about 300 Pa·s, such as less than about 250 Pa·s. The melt viscosity of the mixture, for example, can be from about 80 Pa·s to about 250 Pa·s. The filler particles may comprise various different materials including glass fiber, glass powder, glass flakes, mica, wollastonite, calcium carbonate, silica, and clays. In one particular embodiment, the filler particles comprise talc particles. In general, the filler particles have an average particle size of less than about 10 microns, such as less than about 7 microns. In one embodiment, the filler particles can have an aspect ratio of from about 10:1 to about 50:1.

In addition to having a relatively high melt viscosity, the aromatic liquid crystal polymer can also have a relatively high melting point. For instance, the melting point of the aromatic liquid crystal polymer can be greater than about 300° C., such as greater than about 330° C. The melting point of the aromatic liquid crystal polymer can generally be less than about 450° C., such as less than about 400° C., such as less than about 370° C. In one particular embodiment, for instance, the aromatic liquid crystal polymer has a melting point of from about 300° C. to about 400° C., such as from about 350° C. to about 370° C. As used herein, the melting point of the aromatic liquid crystal polymer is the differential scanning calorimetry (DSC) peak melt temperature as determined by ISO Test No. 11357. Under the DSC procedure, samples were heated and cooled at 20° C. per minute as stated in ISO Standard 10350 using DSC measurements conducted on a TA Q2000 Instrument.

As described above, once the extruded thin substrate is formed, the substrate is thermoformed or blow molded to produce the three-dimensional product. In one embodiment, for instance, the extruded thin substrate is heated to a temperature sufficient for the aromatic liquid crystal polymer to deform or stretch. For example, in one embodiment, the thin substrate can be heated to a temperature above the glass transition temperature but below the melting point of the polymer. For example, in one particular embodiment, the extruded thin substrate is heated to a temperature that is about 100° to about 200° higher than the glass transition temperature of the polymer. The sheet can be heated using any suitable heating device. The heating device may comprise, for instance, an oven, an electrical resistance heater, or an infrared heater. In one embodiment, once the polymeric sheet is heated, the sheet is fed into a vacuum drawing/molding process for producing the three-dimensional product. In an alternative embodiment, the heated substrate is blow molded into the three-dimensional product.

The process of the present disclosure is particularly well suited to forming relatively thin planar products. In one particular embodiment, the process can be used to produce a cookware product. The cookware product may comprise, for instance, a baking tray. It should be understood, however, that in addition to cookware, the process of the present disclosure can be used to produce any suitable article or part. For instance, the process of the present disclosure can be used to produce automotive parts, aircraft parts, circuit boards, and the like.

When extruding, thermoforming or blow molding products as described above, excess composite material may be produced as trim or other scrap that accumulate during the process. Of particular advantage, this reclaimed material may be reground and fed into the process for producing the extruded polymeric sheets. In fact, in one embodiment, the extruded polymeric sheets may contain up to about 50% of reground composite material.

Other features and aspects of the present disclosure are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 1 is a plan view of one embodiment of a cookware tray made in accordance with the present disclosure;

FIG. 2 is a side view of the cookware tray illustrated in FIG. 1;

FIG. 3 is an alternative embodiment of a cookware tray made in accordance with the present disclosure;

FIG. 4 is a side view of one embodiment of a process for forming extruded polymeric sheets in accordance with the present disclosure; and FIG. 5 is a side view of one embodiment of a thermoforming process in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present invention.

In general, the present disclosure is directed to a process for producing three-dimensional products from a composite polymeric composition containing an aromatic liquid crystal polymer and filler particles. The process of the present disclosure is particularly well suited to producing products having a relatively small thickness and a relatively large surface area, such as a cookware tray. Such products are very difficult to produce using injection molding techniques without the products containing significant amounts of defects. As described above, injection molding thin-walled articles having a relatively large amount of surface area requires high injection pressures which can cause warpage, rupturing, stress fractures, and the like.

In accordance with the present disclosure, specially selected aromatic liquid crystal polymers are compounded with filler particles and first extruded into thin substrates. The thin substrates are then thermoformed or blow molded into three-dimensional products. The specially selected aromatic liquid crystal polymer allows for the production of products having excellent surface characteristics and uniform thickness.

Although the composite material and the process of the present disclosure can be used to produce any suitable three-dimensional product, the present disclosure is particularly well suited to producing cooking products, such as cookware and bakeware. For example, the polymeric composition once molded into a desired shape is capable of withstanding very high temperatures, including any oven environment for food processing. In addition to withstanding high temperatures, the polymeric composition is also capable of transitioning from high temperatures to low temperatures and from low temperatures to high temperatures without deteriorating or otherwise degrading due to stress. The polymeric composition also has good hardness, scratch resistance, impact and drop strength and possesses high tensile and flexural strength. The polymeric composition further has a relatively high deflection temperature under load (DTUL) and heat aging properties. The polymeric composition is also not only chemical resistant but also exceptionally inert. The composition, for instance, is capable of being exposed to any one of numerous chemicals used to prepare foods and for cleaning without degrading while remaining resistant to stress cracking. Further, the composition is FDA compliant and does not emit any volatile components when heated and does not have any extractable constituent.

In addition to the above properties, the polymer composition also possesses great inherent anti-stick or release properties. Thus, when molded into a cooking product, no separate coatings need to be applied to the product in order to prevent the product from sticking to food items. In this manner, many bakery goods can be prepared in cookware or bakeware made according to the present disclosure without having to grease the pans before baking, thus affording a more sanitary working environment. The composition also greatly reduces or eliminates a common issue of trapped food or grease in corners of rolled metal pans as solid radius corners can be easily incorporated into the cookware.

Cooking products that may be made according to the present disclosure can vary dramatically depending upon the particular application. The polymeric composition of the present disclosure, for instance, can be used to produce bakeware, cookware, and any suitable parts that may be used in food processing equipment. It also affords a spectrum of contemporary colors.

For exemplary purposes only, various different cookware products that may be made in accordance with the present disclosure are illustrated in FIGS. 1 through 3. FIGS. 1 and 2, for instance, illustrate one embodiment of a cooking pan or tray generally 10. As shown, the tray 10 includes a bottom surface 12 that is surrounded by a plurality of walls 14, 16, 18 and 20. The bottom surface 12 is configured to receive a food item for preparation and/or serving.

As shown in FIGS. 1 and 2, in this embodiment, the tray 10 is surrounded by a lip or flange 22. The flange 22 may have any desired shape and/or length that assists in holding the tray during food preparation and/or when the tray is hot.

Referring to FIG. 2, a side view of the cooking tray 10 is illustrated. As shown, the side wall 16 forms a contour that transitions into the bottom surface 12.

As will be described in greater detail below, the present disclosure is particularly well suited to producing relatively thin products that have large surface areas. In this regard, the cooking tray 10 as shown in FIGS. 1 and 2 may have a length of at least 24 inches. In one embodiment, for instance, the cooking tray 10 may have dimensions of 32 inches×24 inches.

Referring to FIG. 3, an alternative embodiment of a cookware product made in accordance with the present disclosure is shown. In this embodiment, the cookware comprises a muffin pan 50. The muffin pan 50 contains a plurality of cavities 52 for baking various food products, such as muffins or cupcakes. As shown, each cavity 52 includes a bottom surface 54 surrounded by a circular wall 56. The muffin pan 50 can have overall dimensions similar to the cooking tray 10.

In addition to the cookware products illustrated in FIGS. 1 through 3, it should be understood that any suitable cookware or bakeware product may be made in accordance with the present disclosure. For instance, other products that may be made in accordance with the present disclosure include cake pans, pie pans, cooking trays, bun pans, bread pans, and the like. It should be further understood that the products of the present disclosure are not limited to cookware and bakeware products. The process of the present disclosure may be used to produce various other different types of three-dimensional products. Such other products that may be made in accordance with the present disclosure include auto parts such as engine covers, aircraft parts, circuit boards, and the like.

In order to produce three-dimensional products in accordance with the present disclosure, an aromatic liquid crystal polymer is combined with filler particles and extruded into thin substrates, such as sheets. The polymeric sheets are then thermoformed or blow molded into the products, such as those illustrated in FIGS. 1 through 3. The aromatic liquid crystal polymer is selected such that the polymer has a solidification rate and/or crystallization rate that allows for extruding and molding in accordance with the present disclosure without producing tears, ruptures, stress fractures, blisters, or the like. In this regard, the present inventors discovered that the process works best with aromatic liquid crystal polymers having certain properties.

For example, in one embodiment, the aromatic liquid crystal polymer has a relatively high melt viscosity and/or molecular weight. The melt viscosity of the aromatic liquid crystal polymer, for instance, can be greater than about 50 Pa·s, such as greater than about 80 Pa·s, such as greater than about 100 Pa·s, such as greater than about 150 Pa·s. The melt viscosity of the aromatic liquid crystal polymer can generally be less than about 300 Pa·s, such as less than about 275 Pa·s, such as less than about 250 Pa·s. More particularly, the melt viscosity of the aromatic liquid crystal polymer can be from about 80 Pa·s to about 300 Pa·s, such as from about 100 Pa·s to about 275 Pa·s. In one particular embodiment, for instance, the aromatic liquid crystal polymer has a melt viscosity of from about 150 Pa·s to about 250 Pa·s.

When combined with the filler particles, the resulting mixture should also have a relatively high melt viscosity. For instance, in one embodiment, the resulting mixture can have a melt viscosity of greater than about 80 Pa·s when measured at 1000 s$^{-1}$ and at 20° C. above the DSC melt point. In one embodiment, for instance, the melt viscosity of the mixture can be greater than about 100 Pa·s, such as greater than about 120 Pa·s. For example, the melt viscosity of the mixture can be from about 80 Pa·s to about 250 Pa·s.

The aromatic liquid crystal polymer can also have a relatively high melt point. For instance, the melt point of the aromatic liquid crystal polymer can be greater than about 300° C., such as greater than about 330° C. For instance, in one embodiment, the aromatic liquid crystal polymer can have a melting point of from about 350° C. to about 370° C.

In one embodiment, the aromatic liquid crystal polymer can have a relatively high heat of crystallization. For example, the heat of crystallization of the aromatic liquid crystal polymer can be greater than about 3.3 J/g, such as greater than about 3.5 J/g. The aromatic liquid crystal polymer can generally have a heat of crystallization of less than about 6.5 J/g, such as less than about 5.0 J/g, such as less than about 4.5 J/g. In one particular embodiment, for instance, the aromatic liquid crystal polymer can have a heat of crystallization of from about 3.5 J/g to about 4.5 J/g. In addition, the aromatic liquid crystal polymer can also have a heat of fusion of greater than about 3.5 J/g, such as from about 3.5 J/g to about 6.5 J/g.

The aromatic liquid crystal polymer may be formed from various different monomers using different process techniques in order to arrive at the desired properties.

Liquid crystal polyesters, including polyesteramides used in the present invention contain stoichiometric amounts of structural units derived from aromatic hydroxycarboxylic acid, an aromatic dicarboxylic acid, a dioxy structural unit, and/or an aromatic amine or hydroxylamine.

Suitable structural units are derived from aromatic hydroxycarboxylic acids selected from p-hydroxybenzoic acid, 4-hydroxy-4'-biphenylcarboxylic acid, 2-hydroxy-6-naphthalenecarboxylic acid, 2-hydroxy-5-naphthalenecarboxylic acid, 3-hydroxy-2-naphthalenecarboxylic acid, 2-hydroxy-3-naphthalenecarboxylic acid, 4'-hydroxyphenyl-4-benzoic acid, 3'-hydroxyphenyl-4-benzoic acid, 4'-hydroxyphenyl-3-benzoic acid, and alkyl, alkoxy, aryl and halogen substituents thereof. One or more of these structural units may be included in the liquid crystal polyester.

Suitable structural units are derived from aromatic dicarboxylic acids selected from terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl)ether, bis(4-carboxyphenyl)butane, bis(4-carboxyphenyl)ethane, bis(3-carboxyphenyl)ether and bis(3-carboxyphenyl)ethane, and alkyl, alkoxy, aryl and halogen substituents thereof. One or more of these structural units may be included in the liquid crystal polyester. A structural unit derived from isophthalic acid or diphenyl ether-4,4'-dicarboxylic acid is preferred.

Suitable structural units are derived from aromatic dioxy compounds selected from hydroquinone, resorcinol, 2,6-dihydroxynaphthalene, 2,7-dihydroxynaphthalene, 1,6-dihydroxynaphthalene, 4,4'-dihydroxybiphenyl, 3,3'-dihydroxybiphenyl, 3,4'-dihydroxybiphenyl, 4,4'-dihydroxybiphenyl ether and bis(4-hydroxyphenyl)ethane, and alkyl, alkoxy, aryl and halogen substituents thereof. One or more of these structural units may be included. Of these, hydroquinone, 4,4'-dihydroxybiphenyl and 2,6-dihydroxynaphthalene are preferred.

Suitable structural units derived from aromatic diamines or hydroxylamines include those derived from 3-aminophenol, 4-aminophenol, 1,4-phenylenediamine and 1,3-phenylenediamine. One or more kinds of these structural units may be preferably included in the liquid crystal polyester in combination with an aromatic dioxy compound. A structural unit derived from 4-aminophenol is preferred due to its reactivity.

The manufacture of liquid crystal polyesters and polyesteramides is well known on a commercial scale. The ester derivatives of the aromatic hydroxy carboxylic acid and aromatic diol (and/or hydroxyaromatic amine) together with the aromatic diacid are introduced to a reactor and heated to initiate the polycondensation reaction.

Alternatively, it is known to charge the aromatic hydroxycarboxylic acid, aromatic diol (and/or hydroxyaromatic amine) and aromatic diacid to a reactor together with acetic anhydride and a desired polycondensation catalyst, heat the reactor to initiate the acetylation of hydroxyl and/or amino groups of the reactants, remove acetic acid produced by the acetylation, raise the reactor temperature to initiate polycondensation, and allow the reaction to proceed to a desired polymer melt viscosity.

Similarly, it is known to produce polymers having units derived from hydroxybenzoic acid and hydroxynaphthoic acid by charging the esterified derivatives of the aromatic hydroxy acid reactants to a reaction vessel, heating the reactants under vacuum to a temperature at which acetic acid is distilled from the vessel, and subsequently raising the reaction temperature while maintaining the polymer in the melt, while undergoing a staged pressure reduction, until a desired polymer viscosity is reached such as taught in U.S. Pat. No. 4,161,470.

Liquid crystal polymers having the required minimum melt viscosity for use in the present invention must be advanced to a sufficient molecular weight. Due to the melting points of some of the suitable polymers which can approach near the degradation temperatures, it is convenient to perform a first melt polymerization to form solid pellets and in a second stage, to advance the pellet molecular weight under solid state polymerization conditions, such as by heating above about 280° C. but less than the melting or pellet sticking temperature, under a purge of inert gas for a sufficient time of hours to reach a preselected melt viscosity end-point.

Preferred liquid crystal polyesters used herein comprise the following mole % of repeating units based on the following monomers: from 50% to 80% hydroxybenzoic acid; from 10 to 25% of an aromatic dicarboxylic acid and from 10 to 25% of an aromatic diol or combination of aromatic diol and hydroxyaromatic amine. The most preferred aromatic liquid crystal polyester is available from Ticona Polymers Inc, under the VECTRA TREX 901 grade.

In one embodiment, the aromatic liquid crystal polymer can have a heated crystallization of from about 3.5 J/g to about 4.2 J/g, a melt viscosity at 1000 S$^{-1}$ of from about 150 Pa·s to about 250 Pa·s, a polymer melt point of from about 350° C. to about 375° C. and a DTUL at 1.8 MPa of greater than about 230° C., such as from about 230° C. to about 300° C.

In accordance with the present disclosure, the aromatic liquid crystal polymer as described above is combined with filler particles. The filler particles may be in the form of flakes, powder, spheres, plate-like particles, or fibers. Fillers that may be used in accordance with the present disclosure include glass flakes, glass fibers, glass powder, glass spheres, talc, mica, wollastonite, calcium carbonate, silica, clays, calcium sulfate, magnesium carbonate, barium sulfate, calcium silicate, aluminum silicate, and mixtures thereof. Clays that may be used include kaolin or other similar materials. Preferred fillers include talc and/or mica. The filler particles may be untreated or may be coated. For instance, the filler particles may be coated with an oxide of a metal such as aluminum, silicon, or zirconia. In addition, the filler particles may be treated with an organic acid, such as stearic acid or lauric acid or an organosiloxane oil.

The filler particles can have an average particle size of from about 0.01 microns to about 10 microns, such as from about 3 microns to about 10 microns. In one particular embodiment, for instance, the filler particles have a size less than 7 microns.

In one embodiment, the filler particles have a lamellar crystal structure. The filler particles can also have an aspect ratio between about 3 and about 50, such as from about 10 to about 40. The filler particles can also have a loss on ignition (LOI) at 1050° C. of less than about 6%, such as less than about 3% and a moisture content of less than about 0.4%. A talc, for instance, can be selected having a moisture content below about 0.2%.

The filler particles can be combined with the aromatic liquid crystal polymer in an amount up to about 60% by weight. For instance, the filler particles can be present in an amount from about 20% to about 60% by weight, such as from about 30% to about 50% by weight. In one embodiment, the composite mixture used to form the three-dimensional products consists essentially of the filler particles and the aromatic liquid crystal polymer, with other additives being present in amounts less than 2% by weight. In this regard, the resulting three-dimensional product can contain the aromatic liquid crystal polymer in an amount of at least about 40% by weight, such as in an amount from about 40% by weight to about 80% by weight.

In forming the three-dimensional products, the filler particles and the aromatic liquid crystal polymer can be added separately to an extruder or can be pre-compounded together and added to the extruder in the form of pellets.

In order to produce three-dimensional products in accordance with the present disclosure, the aromatic liquid crystal polymer and the filler particles are first extruded into thin substrates, such as sheets. Referring to FIG. 4, for instance, one embodiment of a process for producing the polymeric sheets is shown. As illustrated, the aromatic liquid crystal polymer and filler particles are fed to an extruder 110. As described above, the aromatic liquid crystal polymer and the filler particles can be fed to the extruder. In one embodiment, the aromatic liquid crystal polymer and the filler particles are first compounded together and then fed to the extruder. Compounding filler particles with a liquid crystal polymer is well known in the art. Alternatively, the filler particles and the aromatic liquid crystal polymer can be fed to the extruder separately. When added separately, the filler particles can be added downstream from the polymer.

The extruder 110 heats the aromatic liquid crystal polymer to a temperature sufficient for the polymer to flow and also intimately mixes the polymer with the filler particles. In one embodiment, the aromatic liquid crystal polymer is heated to a temperature in the extruder such that the extrudate temperature of the polymer is at the melting point of the polymer or within a range of about 20° below the melting point of the polymer. The extruder 110 produces a continuous polymeric sheet 112.

Before the aromatic liquid crystal polymer has a chance to solidify, the polymeric sheet 112 is fed into a nip of a calendering device 114. As shown in FIG. 4, in one embodiment, the calendering device 114 may comprise a pair of calendering rolls that form the nip. The continuous polymeric sheet 112 is calendered by the calendering device 114 in order to produce a sheet having uniform thickness.

As described above, the aromatic liquid crystal polymer contained within the continuous sheet 112 should not solidify prior to entering the calendering nip 114. As shown in FIG. 4, once the continuous polymeric sheet 112 is calendered, the continuous sheet 112 is cut into individual sheets 118. Any suitable cutting device 116 may be used to cut the continuous sheet into individual sheets having the proper dimensions.

The polymeric sheets 118 generally have a relatively large surface area in comparison to thickness. The thickness of the polymeric sheets 118, for instance, can generally be less than about 10 mm, such as less than about 5 mm, such as less than about 2 mm. In one embodiment, the sheets have a thickness of less than about 1.6 mm, such as less than about 1.4 mm. For instance, the polymeric sheets 118 may have a thickness of from about 0.4 mm to about 1.6 mm. The surface area of one side of the polymeric sheets may generally be greater than about 900 cm$^2$, such as greater than about 2000 cm$^2$, such as greater than about 4000 cm$^2$. In one embodiment, for instance, the surface area of one side of the polymeric sheet may be from about 1000 cm$^2$ to about 6000 cm$^2$.

Once the polymeric sheets 118 are produced, the sheets can then be fed into a molding process for forming a three-dimensional article. In one embodiment, for instance, the sheets can be thermoformed into products. For instance, referring to FIG. 5, one embodiment of a thermoforming process in accordance with the present disclosure is illustrated.

In FIG. 5, the polymeric sheets 118 are shown being fed into a shaping process. It should be understood, however, that FIGS. 4 and 5 may be combined together into a continuous process.

Referring to FIG. 5, the polymeric sheets 118 are first fed to a heating device 120. The heating device 120 heats the polymeric sheet to a temperature sufficient to cause the polymer to deform or stretch. In general, any suitable heating device may be used. In one embodiment, for instance, the heating device 120 may comprise an oven, such as a convection oven. Alternatively, the heating device 120 may comprise an electrical resistance heater. In still another embodiment, the heating device 120 may comprise an infrared heater.

Once the polymeric sheet 118 is heated in the heating device 120, the sheets are then fed to a molding device 122 where the sheet is molded into a product. Molding of the polymeric sheet 118 should occur before the sheet substantially solidifies and/or crystallizes. Thus, the properties of the aromatic liquid crystal polymer are not only important during production of the polymeric sheets 118, but are also important during the subsequent molding process. If the polymeric sheet 118 were to solidify and/or crystallize too quickly, the polymer may tear, rupture, blister or otherwise form defects in the final product during molding.

As shown in FIG. 5, the polymeric sheet 118 is fed to a molding device 122. In one embodiment, the molding device 122 comprises a vacuum mold. In particular, a suction force is placed against the sheet causing the sheet to conform to the contours of the mold. Ultimately, a molded three-dimensional product 124 is produced, such as a bakeware pan.

During shaping, the polymeric sheet 118 is drawn at least where contours are located on the mold. At the contours, for instance, the draw ratio may be greater than 1:1 to about 5:1.

In an alternative embodiment, instead of thermoforming the polymeric sheet 118 into a three-dimensional product 124, the polymeric sheet can also be blow molded. When blow molding, the molding device 122 uses a gas, such as air or an inert gas, at a pressure sufficient to cause the polymeric sheet to assume a desired shape. Thus, instead of using a suction force, blow molding uses gas pressure. During blow molding, the polymeric sheet may be drawn further reducing the thickness of the sheet in certain areas of the formed product. The draw ration may be greater than 1:1 to about 20:1. For instance, in one embodiment, the three-dimensional product 124 may have areas with a thickness of less than about 200 microns, such as from about 20 microns to about 100 microns.

As described above, various different products may be made in accordance with the present disclosure. In one embodiment, the products can have a relatively small thickness in relation to surface area. For instance, the surface to thickness ratio may be greater than 1000:1, such as greater than 10,000:1, such as greater than 100,000:1.

The extruding process illustrated in FIG. 4 and the molding process illustrated in FIG. 5 can produce a significant amount of trim and other scraps. Of particular advantage, these materials can be reclaimed, ground into small pieces and fed to the extruder 110 as shown in FIG. 4. In fact, three-dimensional products made in accordance with the present disclosure can contain reclaimed composite materials in an amount up to about 50% by weight, such as from about 10% to about 30% by weight.

Of particular advantage, three-dimensional products made in accordance with the present disclosure have many beneficial properties. For example, the molded polymer composition can have a deflection temperature under load (DTUL) of at least about 230° C., such as from about 230° C. to about 300° C. Heat deflection temperature is defined as the temperature at which a standard test bar deflects a specified distance under a load. It is typically used to determine short term heat resistance. As used herein, DTUL is determined according to ISO Test No. 75. More particularly, the polymeric composition of the present disclosure typically has a DTUL at 1.8 MPa of greater than about 255° C., such as greater than about 265° C. For instance, the DTUL can be from about 245° C. to about 300° C. for many applications.

Polymer compositions made according to the present disclosure typically have a notched Izod impact of at least about 10 kJ/m², such as from about 10 kJ/m² to about 60 kJ/m². The notched Izod impact test can be conducted according to ISO Test No. 527.

Also of advantage is that the polymer composition is blister resistant. For instance, the polymer composition displays a minimum blister resistance of at least about 280° C. To test blister resistance, a 127×12.7×0.8 mm test bar is molded at 5° C. to 10° C. higher than the peak melt temperature of the polymer resin as determined by DSC. Ten bars are immersed in hot silicone oil at a given temperature for 3 minutes, subsequently removed, cooled to ambient and then inspected for blisters or surface deformations that may have formed. The test temperature is increased at 10° C. increments until blister or blisters are observed on one or more of the test bars. A blister free temperature of a given material is defined as the highest temperature at which all ten bars tested show no signs of blistering.

The polymer composition of the present disclosure can also have a relatively high melt elasticity. For example, the melt elasticity of the polymer composition can be greater than about 50,000 Pa, such as greater than about 75,000 Pa, such as even greater than about 100,000 Pa. For instance, the melt elasticity can be from about 75,000 Pa to about 150,000 Pa. Melt elasticity is measured at 340° C. using an Ares rheometer.

In addition to the above, the polymer composition can have a tensile strength of from about 100 MPa to about 150 MPa, can have a strain at break of about 2.5% to about 3%, can have a tensile modulus of from about 9000 MPa to about 15,000 MPa, such as from about 10,000 MPa to about 12,000 MPa. The polymer composition can also have a flexural strength of greater than about 125 MPa, such as from about 125 MPa to about 150 MPa and can have a flexural modulus of greater than about 10,000 MPa, such as from about 10,000 MPa to about 15,000 MPa. All of the above properties are measured using standard ISO tests at 23° C.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. An extruded sheet for use in a thermoformed product, wherein the sheet has a thickness of less than about 7 millimeters, the sheet being formed from a polymeric composition that comprises an aromatic liquid crystal polymer and filler particles, wherein the aromatic liquid crystal polymer contains repeating units derived from p-hydroxybenzoic acid, 4,4'-dihydroxybiphenyl, terephthalic acid, and 2-hydroxy-6-naphthalenecarboxylic acid, and wherein the polymer has a heat of crystallization of greater than about 3.3 J/g as determined in accordance with ISO Test No. 11357, a melting point of greater than about 300° C., and a melt viscosity of greater than about 50 Pa-s as determined in accordance with ASTM Test No. 1238-70 at a shear rate of 1000 s$^{-1}$ and at a temperature that is 20° C. above the melting point.

2. The extruded sheet of claim 1, wherein the aromatic liquid crystal polymer has a heat of crystallization of greater than about 3.5 J/g and less than about 4.5 J/g.

3. The extruded sheet of claim 1, wherein the aromatic liquid crystal polymer has a melt viscosity of greater than about 100 Pa-s and less than about 300 Pa-s.

4. The extruded sheet of claim 1, wherein the aromatic liquid crystal polymer has a melting point of greater than about 330° C. and less than about 400° C.

5. The extruded sheet of claim 1, wherein the aromatic liquid crystal polymer contains structural units derived from an aromatic hydroxycarboxylic acid, an aromatic dicarboxylic acid, and an aromatic dioxy compound.

6. The extruded sheet of claim 1, wherein the aromatic liquid crystal polymer has a heat of fusion greater than about 3.5 J/g.

7. The extruded sheet of claim 1, wherein the filler particles include talc, mica, or a combination thereof.

8. The extruded sheet of claim 1, wherein the filler particles have a plate-like shape and have an aspect ratio of from about 10:1 to about 50:1.

9. The extruded sheet of claim 1, wherein the filler particles have an average particle size of less than about 10 microns.

10. The extruded sheet of claim 1, wherein the filler particles are present in the polymeric composition in an amount from about 20% to about 60% by weight.

11. The extruded sheet of claim 1, wherein the sheet has a thickness of from about 0.4 to about 1.6 millimeters.

12. The extruded sheet of claim 1, wherein the polymer composition has a melt viscosity of greater than about 80 Pa-s as determined in accordance with ASTM Test No. 1238-70 at a shear rate of 1000 s$^{-1}$ and at a temperature that is 20° C. above the melting point.

13. The extruded sheet of claim 1, wherein the polymer contains from 50% to 80% of repeating units derived from p-hydroxybenzoic acid, from 10% to 25% of repeating units derived from terephthalic acid, and from 10% to 25% of 4,4'-dihydroxybiphenyl.

* * * * *